_

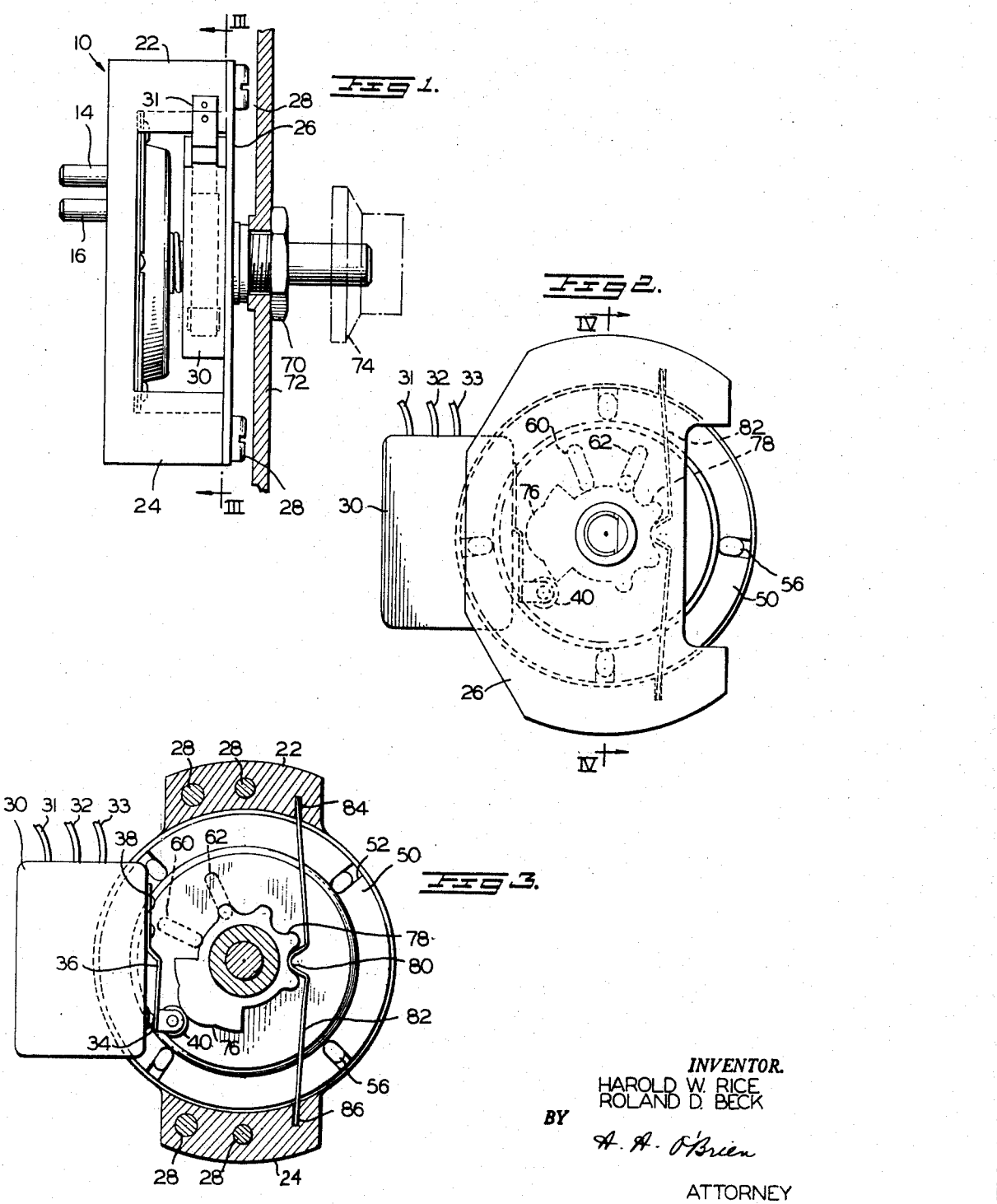

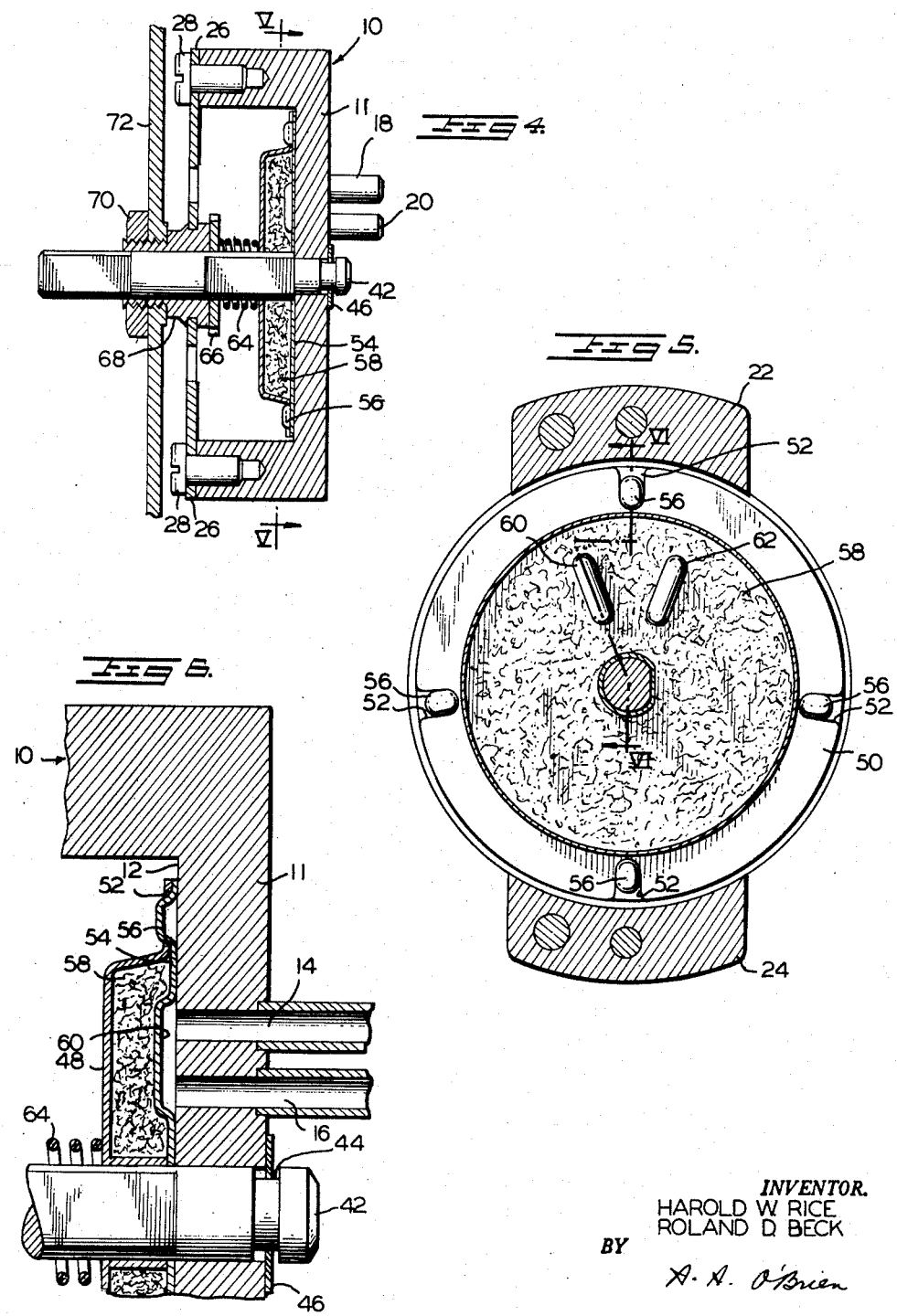

United States Patent Office 3,122,616
Patented Feb. 25, 1964

3,122,616
WATER TEMPERATURE SELECTOR VALVE
AND SWITCH
Harold W. Rice, Fullerton, and Roland D. Beck, Anaheim, Calif., assignors to Robertshaw Controls Company, a corporation of Delaware
Filed Jan. 16, 1962, Ser. No. 166,483
7 Claims. (Cl. 200—61.86)

This invention relates to control devices and in particular to a water temperature selector valve and switch associated with the operation of automatic washing machines.

Modern washing machines are automatically operated in accordance with predetermined operating cycles under the control of sequentially actuated control devices. Such devices include timer motors for the programmer and water mixing valves for delivering various mixtures of hot and cold water to the washing machines. In the present invention a manual selector is utilized to complete a selected electric circuit for actuating the timing means and to complete a selected pneumatic circuit for actuating the water mixing means.

An object of this invention is to complete simultaneously an electric circuit and a pneumatic circuit.

Another object of this invention is to combine switch means and valve means in a single casing for simultaneous actuation.

It is another object of this invention to mount a flexible valve element and switch actuating means on a single control operator.

This invention has another object in that a flexible valve disc is rotated between selected positions for controlling a pneumatic flow by a shaft element which simultaneously causes selective actuation of switching means for controlling an electric circuit.

In a preferred embodiment of the present invention a body member has one wall functioning as a valve block for a pneumatic flow and a flexible valve member engages which valve block to control the pneumatic flow. An electric switch is also carried by the body member for controlling an electric circuit and is selectively actuated by the operator which moves the flexible valve member to its selected position.

Additional features and advantages of this invention will become apparent from the following description of a preferred embodiment taken in connection with the accompanying drawing wherein:

FIG. 1 is a side elevation view of a pneumatic control device embodying this invention;

FIG. 2 is a front elevation view of the device of FIG. 1 with the parts in one operative position;

FIG. 3 is a section taken along line III—III of FIG. 1 but showing the parts in another operative position;

FIG. 4 is a section taken along line IV—IV of FIG. 2;

FIG. 5 is a section taken along the line V—V of FIG. 4; and

FIG. 6 is a section taken along the line VI—VI of FIG. 5.

As is illustrated in FIG. 1, the preferred embodiment of this invention includes a molded base or body member 10 having a generally U-shaped cross section. The bottom wall 11 (FIG. 6) of base 10 presents a smooth surface 12 and a series of bores forming pneumatic conduits. The series of bores are arranged in pairs spaced along a radius from the center of the bottom wall 11; the pair in FIG. 1 has an upper conduit 14 adapted to be connected to a pneumatic source, such as a vacuum pump (not shown) and a lower conduit 16 adapted to be connected to the cold water actuator of a pneumatically operated water mixing valve (not shown); the pair shown in FIG. 4 has an upper conduit 18 adapted to be connected to the pneumatic source and a lower conduit 20 adapted to be connected to the hot water actuator of the water mixing valve. In actual practice it may be desirable to connect the two pneumatic source conduits 14 and 18 to a programmer for additional control with regard to various types of washing machine operating cycles.

The valve block 11 of the body member 10 has a circular configuration and the legs 22 and 24 forming the U-shape construction of the body member 10 cooperate therewith to define an openwork casing. A cover plate 26 is secured to the fill ends of the legs 22 and 24 as by cap screws 28. An electrical switch 30 is fastened by any suitable means to the undersurface of cover plate 26 so as to be partially disposed within the openwork casing of the body member 10. The switch 30 may be any conventional structure and in the particular installation shown on the drawings includes a snap-acting contact for alternate cooperation with a pair of spaced stationary contacts. These contacts are represented by the three terminal posts 31, 32, and 33; posts 31 and 33 being the contacts for two timer motors (not shown) and post 32 being the common contact.

As best shown in FIG. 3, the electric switch 30 includes a plunger 34 for moving the internal snap-acting mechanism. The plunger 34 is engaged by an actuator 36 in the form of a rectangular spring strip which has an offset portion 38 fastened to the switch casing as by rivets and which carries a roller element 40 on its free end for a purpose to be described hereinafter.

A dial stem or control shaft 42 has an annular groove portion 44 (FIG. 6) adjacent one end which extends through a centrally disposed bore in the bottom wall of body member 10. The shaft 42 is rotatably disposed in such bore and is retained therein by any suitable means such as a crescent shaped snap ring 46 which snaps into the groove 44 so as to engage the exterior surface of the valve block 11.

Adjacent the inner valving surface 12, the shaft 42 has a D-shaped cross-section on which is mounted a dish-shaped element 48. An annular flange 50 on the dish-shaped element 48 is notched at 52 about its periphery. A flexible valve element 54 is made of any suitable plastic material in the shape of a circular disc for sliding engagement with the circular valving surface 12. The flexible valve disc 54 has a central aperture for mounting on the shaft 42 and a plurality of raised bosses 56 spaced about its periphery which extend through the notches 52 to effect a driving connection between the flexible valve disc 54 and the dish-shaped element 48. A cavity defined by the dish-shaped element 48 and the flexible disc 54 is filled with a flexible pad 58 of porous resilient material which gently biases the flexible disc 54 into snug engagement with the valving surface 12.

As is illustrated in FIG. 5, the flexible disc 54 is provided with a plurality of spaced bosses or raised channels 60 and 62 that are rectangularly formed with a dimension sufficient to span a selected pair of openings in the valving surface 12. The number of channels on the flexible disc 54 may be varied in accordance with the number of devices to be controlled, while in the present installation only two pneumatically operated control actuators are sufficient. It should also be noted that when such control actuators are to be selectively subjected to atmospheric pressure, the flexible disc 54 may be provided with an aperture so that the conduits 14 and 16 will receive air filtered by the flexible pad 58. The channels 60 and 62 are integrally formed on the flexible disc 54 and provide separate passageways for channelling a pneumatic flow between pairs of pneumatic conduits 14—16 and 18—20.

The dish-shaped element 48 is biased toward the valving surface 12 by a coil spring 64 mounted on the shaft 42 in compression between the dish-shaped element 48 and a selector cam element 66 which is mounted on the D-shaped portion of shaft 42 for rotation thereby. The cam element 66 abuts a bushing 68 centrally carried by the cover plate 26 and forming a journal bearing for the shaft 42. A lock-nut 70 threaded onto the outer end of bushing 68 permits the entire assembly to be fastened to a mounting panel 72 which is provided with suitable indicia (not shown) corresponding to the selected operations of the washing machine. A selector dial on knob 74 is mounted on the outer D-shaped portion of shaft 42 and has a suitable index for cooperation with the indicia on the panel 72. It is to be noted that the shaft 42 is axially movable relative to the dish-shaped element 48 and flexible disc 54 so that axial forces inadvertently supplied to the control knob 74 are not transmitted to the flexible disc 54 to distort the same.

The cam element 66 has a cam surface 76 with cam lobes thereon to engage the roller element 40 and operate the switch 30 in selected positions of the flexible disc 54. Opposite to the cam surface 76, the cam element has a detent surface 78 with spaced detents thereon; the detent surface 78 is engaged by a central detent loop 80 on a detent spring 82 to permit accurate location of the flexible disc 54 in selected controlling positions. The detent spring 82 is in the form of a leaf spring, the opposite ends of which are mounted in opposed notches 84 and 86 in the leg members 22 and 24, respectively.

In the operation of the above described mechanism, it will be assumed that the two pneumatic conduits 14 and 18 are connected by suitable tubing to a pneumatic source such as a vacuum pump and that the two conduits 16 and 20 are connected to the cold and hot water actuators, respectively, of a water mixing valve. Assuming that the washing machine cycle requires a quantity of warm water, the selector dial 74 is rotated to the corresponding selected position wherein the cam element 66 and flexible disc 54 are simultaneously moved to the positions shown in FIG. 2. Thus, the electric switch 30 is actuated to complete an electric circuit for one of the timer motors associated with the programmer, and at the same time a pair of pneumatic flows are completed for the hot and cold water actuators. One pneumatic flow is traced from the cold water actuator to the pneumatic conduit 16, through the channel 60 to the aligned conduit 14 and thence to the vacuum pump; the other pneumatic flow is traced from the hot water actuator to the pneumatic conduit 20, through the channel 62 to the aligned conduit 18 and thence to the vacuum pump. With such an arrangement, the water mixing valve will deliver a quantity of warm water to the washing machine and control means such as a water level control associated with the programmer will interrupt the two pneumatic flows and thus shut off the flow of hot and cold water.

The same operation may be performed when it is desired to select hot water only or cold water only; in the former the dial knob 74 is rotated so that channel 60 spans the pair of conduits 18 and 20 and in the latter the channel 62 spans the other pair of conduits 14 and 16. During a hot water temperature selection, the unused conduits 14 and 16 are sealed by the flexible disc 54 and during a cold water temperature selection, the unused conduits 18 and 20 are similarly sealed.

Inasmuch as the present invention is subjected to many modifications and various changes in detail, it is intended that the foregoing description of the preferred embodiment shown in the drawings shall be interpreted as illustrative and not in a limiting sense.

What is claimed is:

1. A combination switch and valve control comprising a body member, switch means carried by said body member, means defining a plurality of openings extending through said body member, rotatable valve means including a dish-shaped element and a thin sheet flexible member interlocked for unitary rotation, a pad of porous resilient material disposed between said dish-shaped element and said flexible member whereby said flexible member is biased against said body member to seal said openings, a plurality of channels on said flexible member for selective registration with said plurality of openings, a manual operator secured to said valve means for rotating the same, and means on said operator operatively connected to said switch means whereby said valve means and said switch means are simultaneously moved to selected positions by said manual operator.

2. The combination as recited in claim 1 wherein said means on said operator comprises camming means secured to said operator for unitary rotation.

3. A pneumatic and electric control device comprising a body member, electric switch means carried by said body member, a plurality of pneumatic conduits in said body member, valve means disposed for rotation relative to said body member for selective controls of said pneumatic conduits, said valve means including a rotatable element and a flexible disc and peripheral interlocking means defining a driving connection between said rotatable element and said flexible disc, a plurality of channels integrally formed on said flexible disc for establishing flow passageways between said pneumatic conduits, a shaft element rotatably carried by said body member and secured to said rotatable element whereby said flexible disc is rotated relative to said pneumatic conduits, and a cam element fixed for unitary rotation to said shaft element and operatively engaging said electric switch means, said valve means and said electric switch means being simultaneously moved to selective operating positions in response to rotation of said shaft element.

4. The combination as recited in claim 3 wherein detent means accurately locates the rotating positions of said shaft element.

5. In a pneumatic and electric control device, the combination comprising a body member, a wall portion of said body member defining a valve block, a plurality of pairs of pneumatic conduits extending through said valve block, a cover plate for said body member, electric switch means secured to said cover plate and including an actuating roller, a bushing centrally carried by said plate, a dial shaft rotatably carried by said body member and extending through said bushing, a cam element abutting said bushing and mounted for rotation with said shaft in operative position relative to said actuating roller, a dish-shaped element mounted for rotation with said shaft, a coil spring surrounding said shaft and mounted in compression between said cam element and said dish-shaped element a flexible valve disc disposed on said shaft in sliding engagement with said valve block, peripheral interlocking means between said valve disc and said dish-shaped element to effect a driving connection therebetween, a plurality of channels integrally formed on said valve disc for selective positioning relative to said pairs of pneumatic conduits in said valve block, and detent means engaging said cam element to accurately locate said valve disc relative to said pairs of pneumatic conduits.

6. A pneumatic and electric control device comprising a body member, a wall portion of said body member defining a valving surface, a plurality of pneumatic conduits extending through said wall portion to present a plurality of valving ports in said valving surface, a thin flexible valve disc in sliding contact with said valving surface, a plurality of raised channels integrally formed on said disc and being disposed thereon in spaced relation for selective positioning relative to said pneumatic conduits and for controlling pneumatic flows therethrough, a dial shaft extending centrally through said valve disc, an operative connection between said dial shaft and said wall portion whereby said dial shaft is rotatably carried by said body member, a rotatable element secured to said dial shaft for rotation therewith, a peripheral driving connection between said rotatable element and said valve disc for unitary rotation therebetween, a porous resilient material disposed between said rotatable element and said valve disc and biasing said valve disc against said valving surface, switch means having a plurality of controlling positions carried by said body member, cam means operatively disposed between said switch means and said dial shaft whereby said switch means and said valve disc are simultaneously moved to selective controlling positions by rotation of said dial shaft.

7. The combination recited in claim 6, wherein said operative connection between said dial shaft and said wall portion includes a sliding portion whereby said dial shaft may be moved axially to preclude axial forces being transmitted to said valve disc by said dial shaft.

References Cited in the file of this patent

UNITED STATES PATENTS

| | | |
|---|---|---|
| 2,302,061 | Schirm | Nov. 17, 1942 |
| 2,399,033 | Hudson | Apr. 23, 1946 |
| 2,401,237 | Gamble | May 28, 1946 |
| 2,765,810 | Bergquist | Oct. 9, 1956 |
| 2,838,292 | Bramming | June 10, 1958 |
| 2,857,929 | Whitlock | Oct. 28, 1958 |
| 2,921,158 | Taylor | Jan. 12, 1960 |
| 2,952,274 | Anderson | Sept. 13, 1960 |